(12) United States Patent
Sakai et al.

(10) Patent No.: US 7,604,389 B2
(45) Date of Patent: Oct. 20, 2009

(54) SURFACE LIGHT SOURCE DEVICE

(75) Inventors: Seiji Sakai, Tokyo (JP); Takuya Sakamoto, Koshi (JP)

(73) Assignee: Mitsubishi Electric Corporation, Tokyo (JP)

( * ) Notice: Subject to any disclaimer, the term of this patent is extended or adjusted under 35 U.S.C. 154(b) by 232 days.

(21) Appl. No.: 11/696,417

(22) Filed: Apr. 4, 2007

(65) Prior Publication Data

US 2007/0247870 A1    Oct. 25, 2007

(30) Foreign Application Priority Data

Apr. 20, 2006  (JP) .............................. 2006-116974
Dec. 15, 2006  (JP) .............................. 2006-338415

(51) Int. Cl.
*F21V 8/00* (2006.01)

(52) U.S. Cl. ........................... 362/612; 362/634; 349/58

(58) Field of Classification Search ................ 362/612, 362/632, 633, 634; 349/58, 65
See application file for complete search history.

(56) References Cited

U.S. PATENT DOCUMENTS 7,172,327 B2 *   2/2007   Kuo ............................ 362/609

7,360,941 B2 *   4/2008   Yoon et al. ................... 362/632
2006/0114694 A1 *  6/2006   Cho et al. .................... 362/631

FOREIGN PATENT DOCUMENTS

| JP | 2002-229022 | 8/2002 |
|---|---|---|
| JP | 2002-278484 | 9/2002 |
| JP | 2003-76287 | 3/2003 |

* cited by examiner

*Primary Examiner*—Stephen F. Husar
*Assistant Examiner*—Peggy A. Neils
(74) *Attorney, Agent, or Firm*—Oblon, Spivak, McClelland, Maier & Neustadt, L.L.P.

(57) ABSTRACT

A surface light-source device includes: a plurality of point light sources; a light-guide plate arranged for emitting from its emitting surface the light incident on one lateral side thereof from the point light sources; a lower case having a lateral side formed approximately in parallel to the incident surface of the light-guide plate; and a light-source substrate on which the plurality of point light sources are arranged at predetermined intervals, disposed on the light-guide plate side. The surface light-source device is includes a substrate holder that clamps the light-source substrate and the lateral side of the lower case by projections arranged on the substrate holder between adjacent two of the light sources.

16 Claims, 9 Drawing Sheets

SURFACE LIGHT SOURCE DEVICE

BACKGROUND OF THE INVENTION

1. Field of the Invention

The present invention relates to surface light-source devices employing a point light source, suitable for a display device using a liquid crystal panel and the like.

2. Description of the Prior Art

Display devices such as liquid crystal displays, billboards and guiding lights are not self-luminous display devices whose display units radiate light by themselves. These non-self-luminous display devices need a surface light-source device such as a backlight behind the display units. Surface light-source devices are classified into a sidelight type (also referred to as edge-light type) and a direct backlight type. A surface light-source device of the sidelight type has a light source disposed on a lateral side of the housing case; a surface light-source device of the direct backlight type has a light source disposed on the housing-case back side opposing the liquid crystal display unit. In the sidelight-type surface light-source devices, there are those using a light-guide plate in order to guide light from the light source in a desired direction. In the surface light-source devices using a light-guide plate, light from a sidelight source, which is composed of a line light source such as a cold-cathode fluorescent lamp or a point light source such as a light emitting diode (hereinafter referred to as LED), is reflected in the light-guide plate and dispersed by a dot-pattern provided on the light-guide plate. Thereby, surface light is emitted.

In surface light-source devices using a point light source such as a LED as a light emitting element, in order to enhance display panel luminance, it is generally considered that the density of light emitting elements is increased by increasing the number of light emitting elements, or emitting light flux is increased by increasing current supplied to each of the light emitting elements. Either way, however, causes temperature in the vicinity of the light emitting elements to rise due to heat generation associated with light emission of the light emitting elements. As a result, light flux emitted from the point light source is reduced, which raises a problem with reduction of point light-source's lifetime and reliability. Hence, a surface light-source device is proposed that is provided with a heat radiation means attached to the point light-source substrate (refer to Japanese laid-Open Patent Publication No. 2002-229022 and No. 2003-76287, for example). Heat radiation performance can be enhanced in these prior point light-source devices, which brings the density of point light sources and current supplied to each of those to be increased.

The surface light-source devices disclosed in the patents cited above, however, have a problem in that the peripheries or thicknesses thereof inevitably become large due to their structures or in that the number of parts increases. Moreover, they also have another problem in that the surface light-source devices cannot be used in a liquid crystal display device for a machine tool or the like operated over a long period of time because their light sources cannot be replaced.

SUMMARY OF THE INVENTION

The present invention has been made in light of the above-described problems with an object of providing a surface light-source device that has a heat radiation structure of high reliability, and whose point light source is easy to disassemble and replace.

A surface light-source device according to the present invention includes: a plurality of point light sources; a light-guide plate arranged for receiving light, emitted from the point light sources, incident on at least one lateral side of the guide plate, and for emitting light from an emitting surface thereof perpendicular to the one lateral side; a first case having a first lateral side formed approximately in parallel to the one lateral side; a light-source substrate on which the point light sources are arranged at predetermined intervals, being disposed on the first lateral side; a substrate holder having projections in positions corresponding to the intervals between the point light sources, for clamping the light-source substrate and the first lateral side together by the projections; and first holes formed in the first case on the side thereof opposite from the emitting surface, in order for the projections to pass through.

According to the present invention, a surface light-source device is obtained that can efficiently dissipate heat generated in point light sources thereof and enables the point light sources to be replaced.

DESCRIPTION OF THE PREFERRED EMBODIMENTS

Embodiment 1

Figure 1:
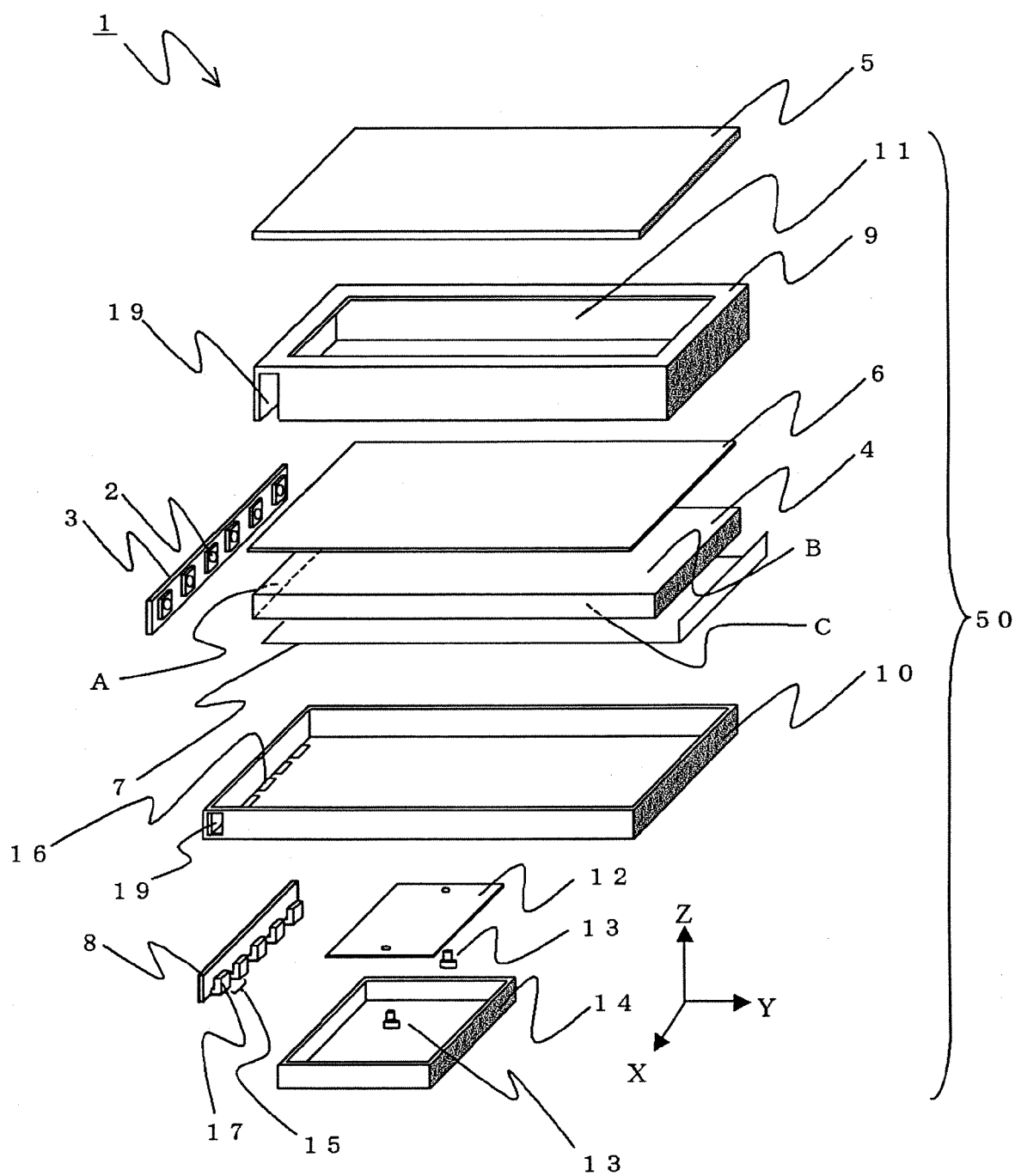
FIG. 1 is an exploded perspective view illustrating a liquid crystal display device according to Embodiment 1 of the present invention.
Figure 2:
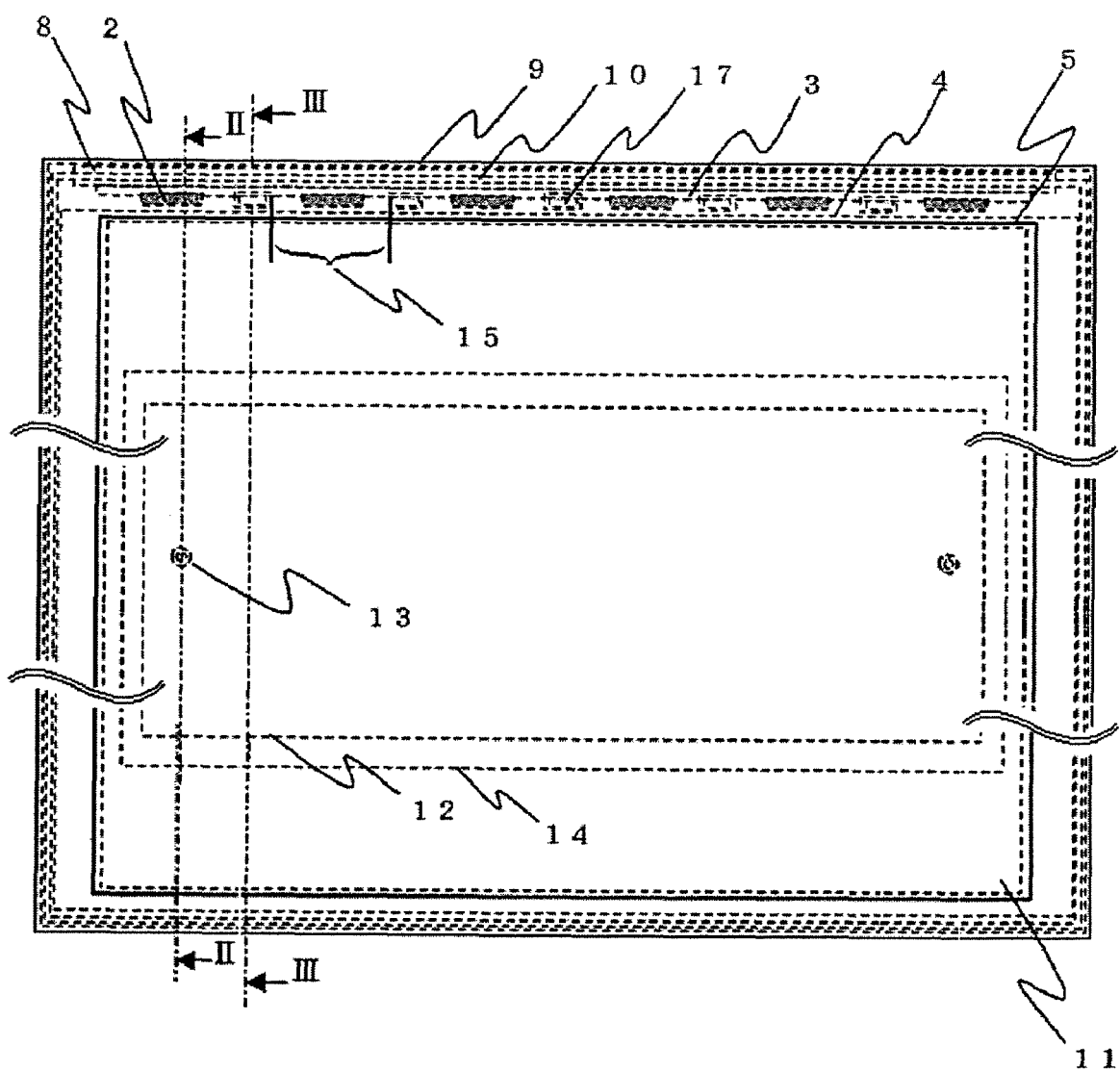
FIG. 2 is a front view illustrating the liquid crystal display device according to Embodiment 1 of the invention.
Figure 3:
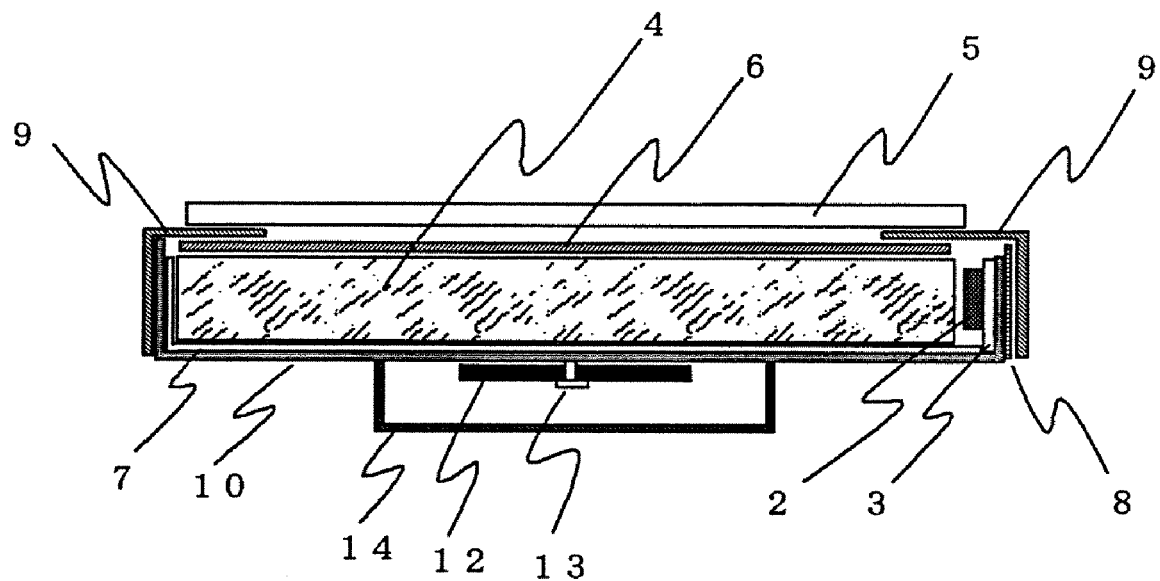
FIG. 3 is a cross-sectional view including a point light source of the liquid crystal display device according to Embodiment 1 of the invention.
Figure 4:
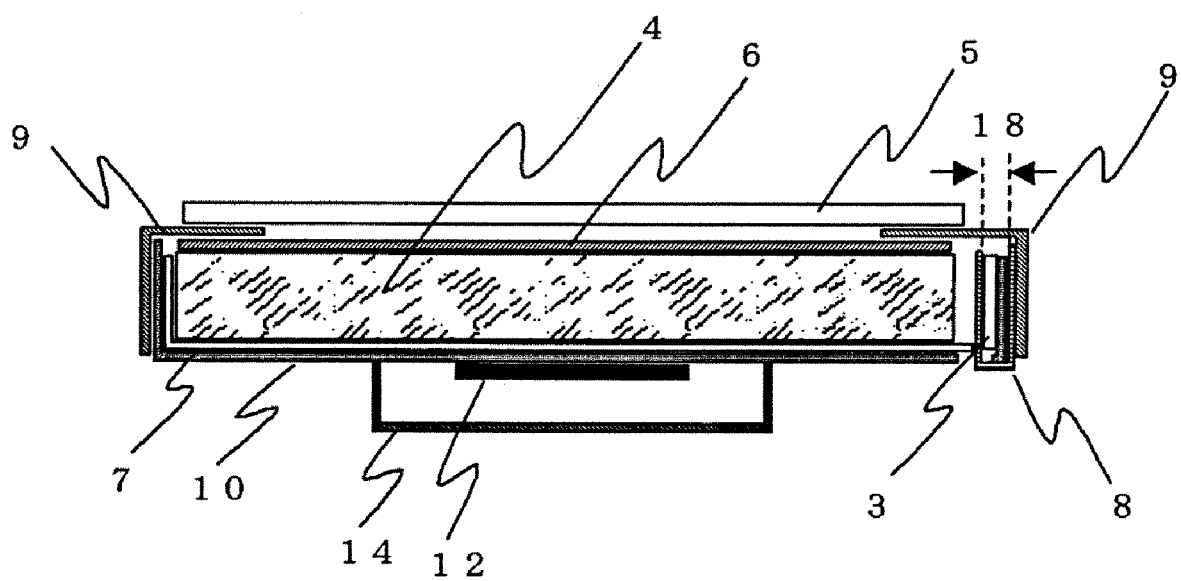
FIG. 4 is a cross-sectional view between two adjacent point light sources of the liquid crystal display device according to Embodiment 1 of the invention.
Figure 5:
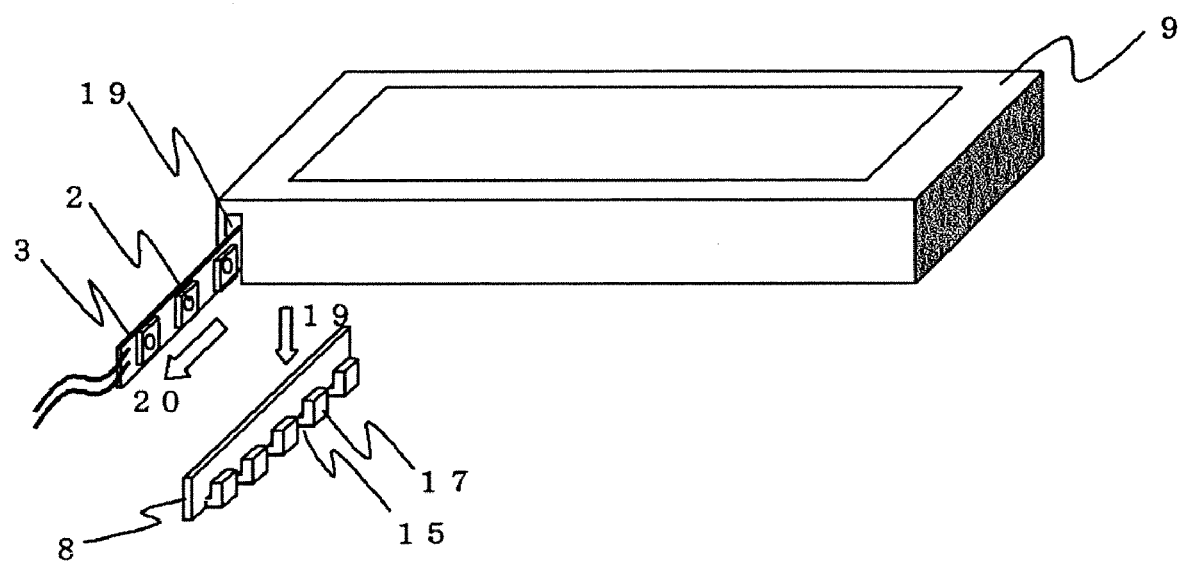
FIG. 5 is a perspective view illustrating replacing the light source of the liquid crystal display device according to Embodiment 1 of the invention.

Embodiment 1 of the present invention is explained with reference to FIGS. 1 through 5. Here, FIG. 1 is an exploded perspective view for explaining a configuration of a liquid crystal display device 1 employing a surface light-source device 50 in Embodiment 1; FIG. 2 is a front view illustrating the liquid crystal display device 1 completed by assembling all components shown in the exploded view of FIG. 1, viewed from the display surface; FIGS. 3 and 4 are cross-sectional views taken along Lines II-II and III-III, respectively, indicated in the front view of FIG. 2; and FIG. 5 is an enlarged perspective view for explaining disassembly and replacement of a light-source substrate 3 of the liquid crystal display device 1 in Embodiment 1.

First, a detailed explanation will be made on the liquid crystal display device 1 with reference to FIG. 1, in particular, on a configuration of the surface light-source device 50 disposed behind a liquid crystal panel 5. Referring to FIG. 1, a plurality of point light sources 2 using LEDs or the like is mounted being arranged approximately in line on the light-source substrate 3. The point light sources 2 are disposed adjacent to a lateral side of a light-guide plate 4 (hereinafter one lateral side on which light from the light sources are incident is referred to as incident surface A). Light incident on the incident surface A from the light sources 2 is emitted from an emitting surface B (a surface of the light-guide plate 4, facing the liquid crystal panel 5). Optical sheets 6 are placed on the emitting surface B of the light-guide plate 4 and a reflection sheet 7 is placed on an opposite non-emitting surface C of the light-guide plate 4 (hereinafter the opposite non-emitting surface C is defined to be a surface opposed to the emitting surface B, of the light-guide plate 4). In the surface light-source device 50 shown in FIG. 1, the point light sources 2, the light-source substrate 3, a substrate holder 8, the light-guide plate 4, the optical sheets 6, and the reflection sheet 7 are contained inside between an upper case 9 (a second case) and a lower case 10 (a first case). An emitting aperture 11 is formed in the top side of the upper case 9 facing the emitting surface B. Accordingly, the surface light-source device 50 emits surface light from the emitting aperture 11. In addition, the emitting aperture 11 is designed in such a size that the periphery thereof is formed inside the outer periphery of the light-guide plate 4.

Laser diodes or the like are generally used other than LEDs as point light sources. As for LEDs, there is a case of using a pseudo-white LED or the like composed of a semiconductor light emitting-element that emits monochromatic light such as blue, and a fluorescent substance that emits yellow light by absorbing part of the blue light emitted from the semiconductor light emitting element. There is another case of using LEDs provided with elements emitting red, green, and blue lights, to emit a white light produced by mixing the three monochromatic lights. In Embodiment 1, pseudo-white LEDs are used as the point light sources 2.

The point light sources 2 are mounted at predetermined intervals on the light-source substrate 3 as shown in FIG. 1. The light-source substrate 3 is disposed facing the incident surface A of the light-guide plate 4. While the point light sources 2 and the light-source substrate 3 are disposed facing the one lateral side only of the light-guide plate 4 in FIG. 1, the present invention is not limited to this but each set of the point light sources 2 and the light-source substrate 3 may be disposed facing right and left lateral sides of the light-guide plate 4. In order to supply power to the point light sources 2, a circuit pattern, which is not shown in the figures, is also formed on the light-source substrate 3, in addition to the point light sources 2 mounted thereon. Using a metal core substrate for the light-source substrate 3 can efficiently transfer heat generated in the point light sources 2 to the surroundings. Moreover, mounting the point light sources 2 on the light-source substrate 3 with using a thin flexible printing circuit (hereinafter referred to as FPC), the heat can be still more efficiently conducted. Furthermore, using a FPC for the light-source substrate 3 can reduce the surface light-source device 50 in size.

In Embodiment 1, a transparent acrylic resin is used as a material for the light-guide plate 4; other materials such as polycarbonate resin or glass can also be used therefor. A light scattering layer (not shown) is formed on the opposite non-emitting surface C of the light-guide plate 4 in order to guide light to the emitting surface B by disturbing directions of light propagation. The light scattering layer serves as a means for reflecting light toward the inside of the light-guide plate 4. There are several methods of forming a light scattering layer, specifically, such as printing a dot-pattern on the opposite non-emitting surface C, making the opposite non-emitting surface C rough, or forming on the opposite non-emitting surface C ruggedness such as micro spherical irregularities or micro prisms to deflect light propagation. Even in a case of forming ruggedness on the emitting surface B by matting process without providing the light scattering layer on the opposite non-emitting surface C, the same effect can also be brought about. That is, when ruggedness is formed on the emitting surface B of the light-guide plate 4, light to be emitted from the emission surface B is scattered so that directions of its propagation are deflected by the ruggedness. As a result, a certain amount of light emitted from the emitting surface B is reflected toward the inside of the light-guide plate 4 and the remaining light is emitted outward from the emitting surface B. Accordingly, provision of matting process on only the emitting surface B can eliminate a reflection means to be provided on the other surfaces of the light-guide plate 4. Forming the emitting surface B demonstrates the same effect as that of a light scattering layer such as a dot pattern printed on the opposite non-emitting surface C, so as to serve as a reflection means.

Optical sheets 6 are configured with a plurality of optical sheets, to be more specific, are configured such that a lens sheet is sandwiched between diffusion sheets, and disposed on the light-guide plate 4. If luminance of the surface light-source device 50 needs to be enhanced, a plurality of lens sheets may be combined taking into account their prism orientations. Two or more diffusion sheets can also be used in combination in order to improve its diffusivity. The optical sheets 6 may be configured with or without one lens sheet depending on its light distribution characteristic. The optical sheets 6 may also be configured by combining a protection sheet with either a lens sheet or the reflection sheet 7. In any case, a configuration of the optical sheets 6 is preferable to be optimized taking into account a required luminance and light distribution characteristics.

As for the reflection sheet 7, polypropylene or polyethylene-terephthalate (hereinafter referred to as PET) mixed with barium sulfate or titanium oxide is used as a material therefor. A material such as a resin with micro-bubbles formed inside the resin, a metal plate vapor-deposited with silver, or a metal plate coated with a paint containing titanium oxide or the like may also be used for the reflection sheet 7. The reflection sheet 7 desirably has a reflectivity of 90% or higher. For that purpose, a plurality of such reflection sheets 7 may be stacked to improve its reflectivity. Improving reflectivity of the reflection sheet 7 brings luminance to increase at the emitting aperture 11. Moreover, luminance uniformity at the emitting surface B of the light-guide plate 4 can be improved by printing a dot-pattern on either surface of the reflection sheet 7. Furthermore, by printing a color on the reflection sheet 7, color variation at the emitting surface B due to light absorption in the light-guide plate 4 or the reflection sheet 7 can be compensated. In the case of printing a color on the reflection sheet 7 surface facing the emitting plate 4, it is possible to finely tune influences on the emitting surface B, which brings a merit in which luminance and color unevenness among the point light sources 2 can be further controlled, allowing easy suppression. In addition, while the reflection sheet 7 is disposed only on the non-emitting surface C of the light guide plate 4 in FIG. 1, the reflection sheet 7 may be disposed on lateral sides other than the emitting surface A (which is not shown in FIG. 1, but refer to FIGS. 2 through 4) so that light emitted from the lateral sides can be reflected back into the light guide plate 4, allowing luminance to be improved at the emitting surface B.

The upper case 9 has the emitting aperture 11 through which light passes from the emitting surface B of the light-guide plate 4, and configured such that light does not leak out as much as possible from the other portions. Metal such as aluminum, stainless steel, or iron, or resin such as polycarbonate or acrylonitrile-butadiene-styrene (hereinafter referred to as PC and ABS, respectively) can be used as a material for the upper case 9

The substrate holder 8, in addition to having the function of clamping the light-source substrate 3 and a lateral side of the lower case 10 (a first lateral side), has a function as a reflector to reflect part of light emitted from the point light sources 2 to the incident surface A of the light-guide plate 4. Resin such as PC or ABS, or metal of high strength and elasticity such as aluminum or stainless steel is a desirable material for the substrate holder 8.

The lower case 10 has functions of not only holding the light-guide plate 4, the reflection sheet 7 and the like but also conducting heat generated from the point light sources 2 so as to dissipate the heat to the surroundings. For that reason, metal of high strength and conductivity is a desirable material for the lower case 10. In particular, using aluminum of high thermal conductivity for the lower case 10, heat from the point light sources 2 can be efficiently diffused over the casing so that temperature of the point light sources 2 can be decreased. Moreover, in order to efficiently dissipate heat diffused over the lower case 10 to the air, the lower case 10 is particularly preferable to be arranged in the outermost periphery of the surface light-source device 50.

In the surface light-source device 50 shown in FIG. 1, the liquid crystal panel 5 is disposed above the emitting aperture 11, that is, the liquid crystal panel 5 is disposed above the emitting surface B of the light-guide plate 4 with the optical sheets 6 being interposed therebetween. Since the liquid crystal panel 5 is a commonly used one in the invention, a detailed explanation on its display operation will be omitted.

The display device is provided with a circuit board 12 for driving the liquid crystal panel 5. A copper wiring pattern, not shown, is formed on a glass-epoxy layer or the like of the circuit board 12, and a plurality of electronic parts is mounted thereon by soldering. The circuit board 12 is, in most cases, disposed on the back side (the side where light is not emitted) of the surface light-source device 50 and mechanically fixed thereto by fixing screws 13, caulking, hooking nails, or the like. Moreover, a protection cover 14 is also mechanically attached to the back side of the surface light-source device 50 by screws, caulking, or the like (not shown) to protect the circuit board 12 against static charge or outside pressure. Aluminum, stainless steel, galvanized steel, or the like is used as a material for the protection cover 14. A resin sheet (not shown) of PET or the like is attached on the protection cover 14 on the circuit board 12 side, to avoid the cover from electrically touching the circuit board 12 and the electronic parts thereon. In addition, the protection cover 14 has a hole (not shown) near a variable resister on the circuit board 12 for finely adjusting the resister after having been attached. A PET sheet can be substituted for the protection cover 14 if outside pressure or the like is not large. In this case, there is no need for attaching an insulation sheet between the circuit board 12 and the protection cover 14, which allows the number of parts as well as cost to be reduced.

Next, an explanation will be made on optical paths through which light passes after it has been emitted from the point light sources 2 until it is emitted from the emitting surface B of the light-guide plate 4. First, the light emitted from the point light sources 2 is incident on the incident surface A of the light-guide plate 4 directly or as being reflected by the reflection sheet 7. The light incident on the incident surface A of the light-guide plate 4 propagates inside the guide plate as repeating total reflection at the boundary between the light-guide plate 4 and its outside air layer. The light that propagates inside the light-guide plate 4 is subject to diffusion reflection at a dot-pattern printed on the opposite non-emitting surface C of the light-guide plate 4. Since light propagation is deflected at the opposite non-emitting surface C, light not exceeding the critical angle with respect to the boundary between the light-guide plate 4 and the air layer can be emitted from the emitting surface B. Light emitted from the emitting surface B is incident on the liquid crystal panel 5 through the optical sheets 6. While part of light is to be emitted from surfaces other than the emitting surface B, the light is reflected by the reflecting sheet 7 disposed on lateral sides except for the incident surface A and the opposite non-emitting surface C. Therefore, the light is incident again on the light-guide plate 4, namely, it will never be emitted from sides other than the emitting surface B.

Next, an explanation will be made on a structure in the proximity of the point light sources 2 of the light-source device 50 in this embodiment. FIG. 2 is a front view illustrating the liquid crystal display device 1, viewed from the display surface; FIGS. 3 and 4 are cross-sectional views of the liquid crystal display device 1, taken along given lines: FIG. 3 is the II-II directed cross-sectional view including one of the point light sources 2; FIG. 4, the III-III directed cross-sectional view between adjacent two of the point light sources 2.

As apparent from FIG. 2 and the cross-sectional view of FIG. 4, projections 17 are formed on the substrate holder 8 in positions corresponding to intervals between the point light sources 2 so as to hold the light source substrate 3. Moreover, as apparent from FIGS. 2 and the cross-sectional view of FIG. 3 including one of the point light sources 2, spaces 15 are formed on the substrate holder 8 in positions corresponding to those between adjacent two of the point light sources 2 so as to avoid interfering between the point light sources 2 and projections 17. A lateral side contacted with the lower case 10, of the substrate holder 8 is a plane surface without such projections being formed thereon even in the positions corresponding to the point light sources 2,. Through holes 16 (first holes) are formed in the undersurface of the lower case 10, in order for projections 17 on the substrate holder 8 to be passed through the holes. Here, in the above explanation, while the lead lines and the reference numerals for the point light sources 2 and the projections 17 in FIGS. 1 through 3 are given to only one part of each for simplicity of the figures, there is a plurality of corresponding parts as apparent from the figures. The following explanations will be made by specifying a representative one of each as with FIGS. 1 through 3.

Next, an explanation will be made on the cross-sectional structure between adjacent two of the point light sources 2 in FIG. 4. The light-source substrate 3 and the lateral side formed approximately in parallel to the incident surface A of the light-guide plate 4, of the lower case 10 (the first lateral side) are clamped by a lateral side of the substrate holder 8 and the projections 17 thereon. By making a clearance 18, formed between the substrate holder 8 and the projections 17, equal to or slightly smaller than the sum of thicknesses of the light-source substrate 3 and the lateral side of the lower case 10, the clearance 18 is forced to become slightly larger than a given amount when the substrate holder 8 is pushed toward the light-source substrate 3 and the lateral side of the lower case 10 so as to clamp them. With such configuration, pressure is increased that clamps the light-source substrate 3 and the lower case 10 by elastic force of the substrate holder 8. Consequently, thermal resistance between the light-source substrate 3 and the lower case 10 can be reduced, that is, the influence of heat from the point light sources 2 can be reduced.

The reflection sheet 7 on the opposite non-emitting-surface C side of the light-guide plate 4 is disposed extending to the point light sources 2 as shown in FIGS. 2 through 4. Thereby, the opposite non-emitting surface C does not become uncovered, that is, light from the point light sources 2 does not directly enter the opposite non-emitting surface C.

In the surface light-source device 50 using the point light sources 2 of LEDs or the like as a light source, there occurs luminance unevenness in which vicinities of the point light sources 2 become brighter and those between adjacent two thereof become darker. A method is used as a countermeasure against the unevenness, in which a dot-pattern is printed lightly in the vicinities of the point light sources 2 and thickly between adjacent two thereof as described above.

Next, a method of inserting and withdrawing the light-source substrate 3 will be explained with reference to FIG. 5. Insert-withdraw holes 19 (second holes) each are formed in lateral sides perpendicular to the light-source substrate 3, of the upper case 9 and the lower case 10. The substrate holder 8 that clamps the light-source substrate 3 and the lateral side of lower case 10 is removed away from the opposite non-emitting surface C. Then, the light source substrate 3 is withdrawn as being slid out through the insert-withdraw holes 19.

In mounting, the light-source substrate 3 is inserted through the insert-withdraw holes 19. After the light-source substrate 3 has been inserted, the substrate holder 8 is mounted with the projections thereon being passed through the through holes 16 formed in the lower case 10 on the opposite non-emitting-surface side. The light-source substrate 3 and the lateral side of lower case 10 are maintained in the clamped state by elastic force of the substrate holder 8.

Figure 6:
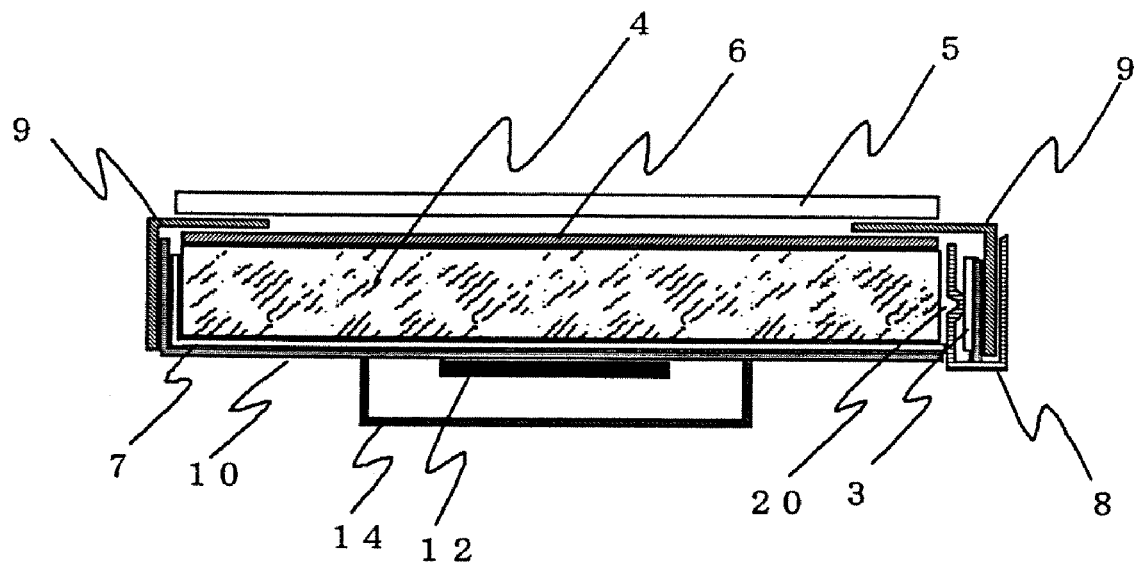
FIG. 6 is a cross-sectional view between two adjacent point light sources of a liquid crystal display device in another aspect of Embodiment 1 of the invention.

While the substrate holder 8 clamps the light-source substrate 3 and the lateral side of the lower case 10 in FIG. 4, it is also possible to configure such that the substrate holder 8 clamps the light-source substrate 3, the lateral side of the lower case 10, and a lateral side of the upper case 9 (a second lateral side) together as shown in FIG. 6. The substrate holder 8 may also clamp other members as long as it can clamp the light-source substrate 3 and the lateral side of the lower case 10 even with a structure other than that in Embodiment 1.

The substrate holder 8 in FIG. 6 has bulges 20 formed projected toward the substrate, on the projections 17. Thereby, a height-wise middle portion of the substrate, which is the most important portion for heat dissipation, can be strongly clamped because the point light sources 2 are mounted approximately at the middle of the light-source substrate 3. Consequently, thermal resistance between the light-source substrate 3 and the lateral side of the lower case 10 can be reduced, that is, the influence of heat from the point light sources 2 can be reduced. Moreover, since the bulges 20 and the light-source substrate 3 are in point contact with each other, frictional resistance in mounting the substrate holder 8 is lowered, which will be preferable to improve workability.

Moreover, by forming bosses (not shown) in the lateral side of the upper case 9 and holes (not shown) in the lateral side of the substrate holder 8 in the positions corresponding to the respective bosses, and configuring such that the bosses fit into the respective holes, the light-source substrate 3 can be fixed in position. Thereby, the light-source substrate 3 can be prevented from being slipped out of place to come off even when external force by vibration, impact, or the like acts thereon.

Furthermore, it is more preferable to provide mechanical fits, such as nails, hooks, or holes that fixes the respective members, in positions where the substrate holder 8 contacts the lateral side of the upper case 9 so that the upper cases 9, the lower case 10, and the light-source substrate 3 can be prevented from coming off even when external force by vibration, impact, or the like acts thereon.

Embodiment 2

Embodiment 2 of the present invention is explained with reference to FIGS. 7 through 9. Configurations of components such as the light-guide plate 4, the optical sheets 6, the reflection sheet 7, the upper case 9 (the second case), the lower case 10 (the first case), the circuit board 12, and the protection case 14 in Embodiment 2 are the same as those in Embodiment 1, and the same reference numerals are assigned to them; their explanations are omitted here. The following explanations will be made with reference to FIGS. 7 through 9, particularly on the shapes of the point light sources 2, the light-source substrate 3, and the substrate holder 8, and those of portions, which are associated with them, in the upper case 9 and the lower case 10. Here, the same components as those in FIGS. 1 through 6 are assigned the same reference numerals.

Figure 7:
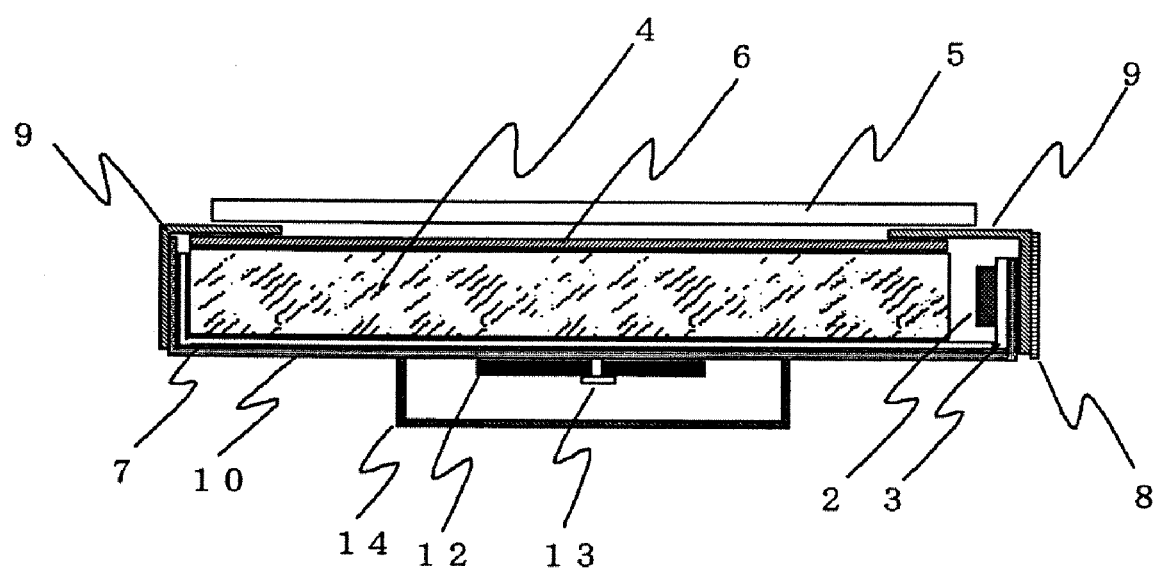
FIG. 7 is a cross-sectional view including a point light source of a liquid crystal display device according to Embodiment 2 of the present invention.
Figure 8:
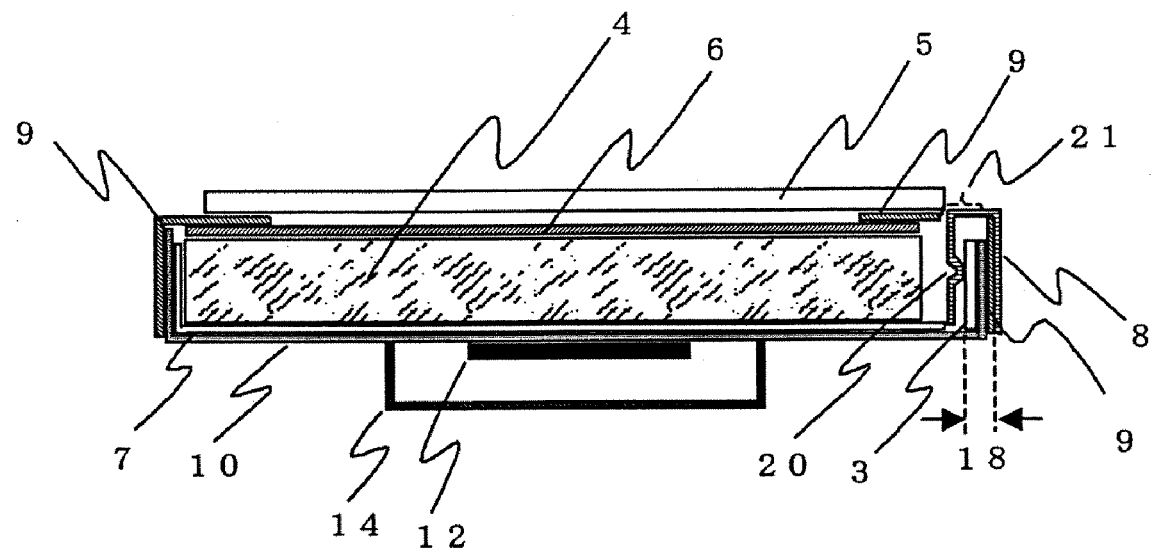
FIG. 8 is a cross-sectional view between two adjacent point light sources of the liquid crystal display device according to Embodiment 2 of the invention.
Figure 9:
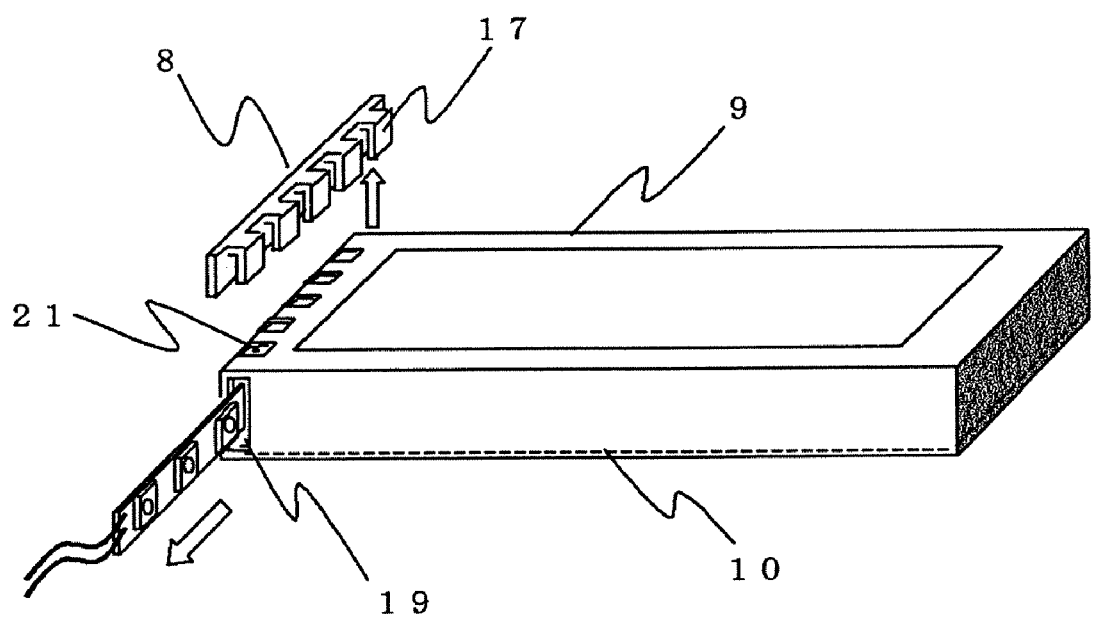
FIG. 9 is a perspective view illustrating replacing the light source of the liquid crystal display device according to Embodiment 2 of the invention.

FIGS. 7 and 8 are cross-sectional views of the liquid crystal display device 1 in given positions: FIG. 7 is the II-II directed cross-sectional view including one of the point light sources 2; FIG. 8, the III-III directed cross-sectional view between adjacent two of the point light sources 2. FIG. 9 is an enlarged perspective view for explaining disassembly and replacement of the light-source substrate 3 of the liquid crystal display device 1 in Embodiment 2.

First, as apparent from FIG. 7, the spaces 15, not shown, are formed on the substrate holder 8 in the position corresponding to the point light sources 2 (that is, in the positions between adjacent two of projections 17) so as to avoid interfering between the point light sources 2 and the projections 17. A lateral side of the substrate holder 8, contacting the upper case 9, is a plane surface without projections or the like even in the positions corresponding to those between adjacent two of the point light sources 2.

Next, an explanation will be made on the cross-sectional structure between adjacent two of the point light sources 2, shown in FIG. 8. The light-source substrate 3 and the lateral sides, formed approximately in parallel to the incident surface A of the light-guide plate 4, of the lower case 10 (the first lateral side) and the upper case 9 (the second lateral side) are clamped by the lateral side of the substrate holder 8 and the projections 17 thereon. By making the clearance 18, formed between the substrate holder 8 and the projections 17, equal to or slightly smaller than the sum of thicknesses of the light-source substrate 3, the lateral sides of the lower case 10, and the upper case 9, the clearance 18 is forced to become slightly larger than a given amount when the substrate holder 8 is pushed toward the light-source substrate 3, the lower case 10, and the upper case 9 so as to clamp them. Moreover, the bulges 20 are formed on the projections 17 (refer to FIG. 9) on the substrate holder 8 on the substrate side. With such configuration, the light-source substrate 3, and the lateral sides of the lower case 10 and the upper case 9 are clamped by increased pressure by elastic force of the substrate holder 8. Consequently, thermal resistance among the light-source substrate 3, the lower case 10, and the upper case 9 can be reduced, that is, the influence of heat from the point light sources 2 can be reduced. Moreover, it is noted that through holes 21 (third holes) are formed in the surface between adjacent two of the point light sources 2, of the upper case 9 on the emitting-surface side (hereinafter the side whose surface faces the liquid crystal panel 5 of the surface light-source device 50 is referred to as emitting-surface side) in order for the projections 17 to be put into the holes and passed therethrough.

In Embodiment 2, there is no need to form holes in the lower case 10, which therefore allows heat to be transferred from the light-source substrate 3 to the undersurface of the lower case 10. Consequently, the influence of heat from the point light sources 2 can be reduced and no holes in the lower case 10 improve its strength as well.

While the substrate holder 8 clamps the light-source substrate 3, the lower case 10, and the upper case 9 in Embodiment 2, the substrate holder 8 can clamp the light-source substrate 3 and the lower case 10 only. Other members may also be clamped as long as the light-source substrate 3 and the lateral side of the lower case 10 are in tight contact with each other.

Next, a method of inserting and withdrawing the light-source substrate 3 will be explained with reference to FIG. 9. The insert-withdraw holes 19 (the second holes) each are formed in the lateral sides perpendicular to the light-source substrate 3, of the lower case 10 and the upper case 9. The substrate holder 8 that clamps the light-source substrate 3, and the lateral sides of lower case 10 and the upper case 9 is removed in the emitting-surface direction. Then, the light-source substrate 3 is withdrawn as being slid through the insert-withdraw holes 19.

In mounting, the light-source substrate 3 is inserted through the insert-withdraw holes 19. After the light-source substrate 3 has been inserted, the substrate holder 8 is mounted with the projections thereon being passed through the through holes 21 formed in the surface of the upper case 9 on the emitting-surface side. The light-source substrate 3, and the lateral sides of lower case 10 and the upper case 9 are maintained in the clamped state by elastic force of the substrate holder 8.

Moreover, similar to Embodiment 1, bosses and holes may be formed for mutually positioning the substrate holder 8 and the lateral side of the lower case 10, and mechanical fastenings may also be provided further for fitting the substrate holder 8 and the upper case 9 with each other. An explanation on their effect is omitted because the effect is the same as that in Embodiment 1.

Embodiment 3

Figure 10:
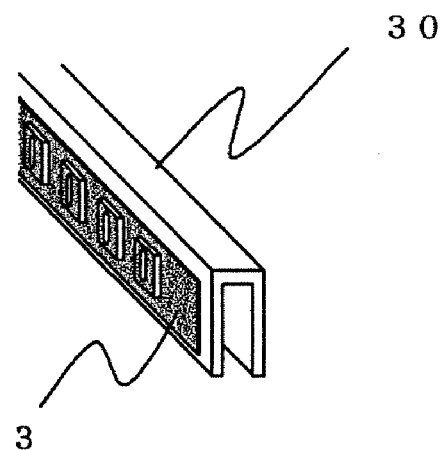
FIG. 10 is an enlarged perspective view illustrating a substrate retainer of a liquid crystal display device according to Embodiment 3 of the present invention.

Embodiment 3 of the present invention will be explained with reference to FIGS. 10 through 13. FIGS. 10 and 12 are enlarged perspective views illustrating the light-source substrate 3 and a substrate retainer 30, and FIGS. 11 and 13 are cross-sectional views illustrating a complete display device.

Figure 11:
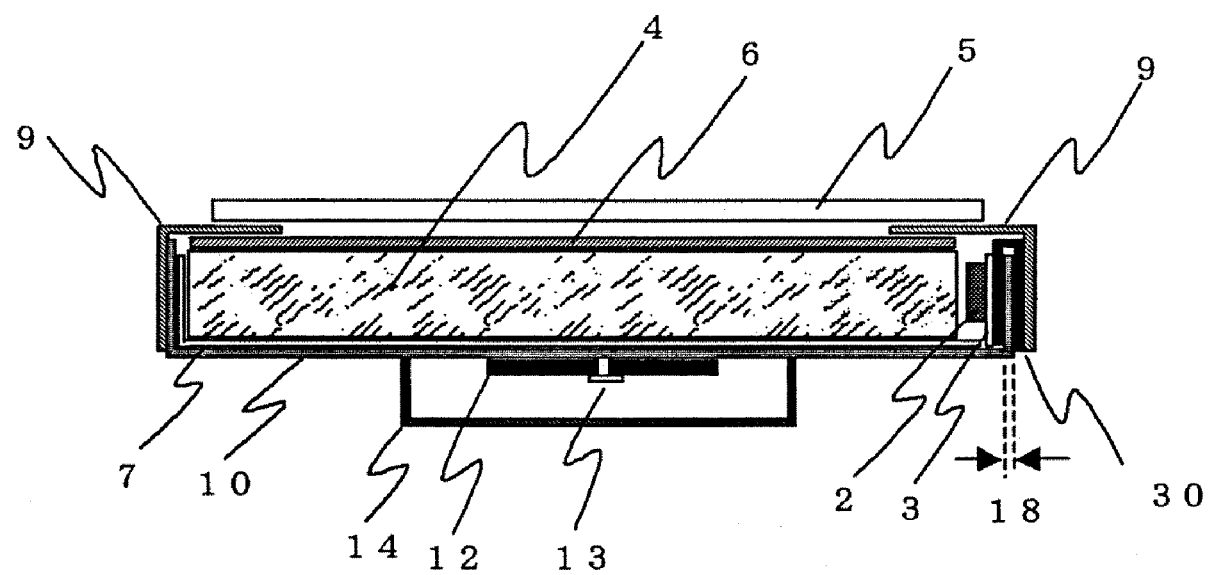
FIG. 11 is a cross-sectional view including a point light source of the liquid crystal display device according to Embodiment 3 of the invention.
Figure 12:
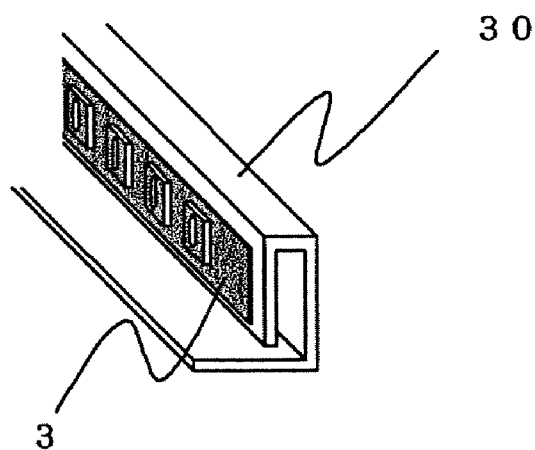
FIG. 12 is an enlarged perspective view illustrating a substrate retainer of a liquid crystal display device in another aspect of Embodiment 3 of the invention.

FIG. 10 is the view illustrating an external appearance of the light-source substrate 3 and the substrate retainer 30, and FIG. 11 is the III-III directed cross-sectional view as indicated in Embodiment 1 described above. Here, difference from Embodiment 1 and 2 is explained. Configurations of components such as the light-guide plate 4, the optical sheets 6, the reflection sheet 7, the upper case 9 (the second case), the lower case 10 (the first case), the circuit board 12, and the protection case 14 in Embodiment 3 are the same as those in Embodiment 1, and the same reference numerals are assigned to them; their explanations are omitted here.

The difference from Embodiment 1 and 2 is that the light-source substrate 3 and the substrate retainer 30 are integrated as shown in FIG. 10. The substrate retainer 30 has such a shape that the lateral side of the lower case 10 (the first lateral side) is clamped from both sides thereof. The light-source substrate 3 in Embodiment 3 is made of a glass-epoxy wiring substrate or FPC on which the point light sources 2 are mounted, and integrally configured with the substrate retainer 30 of a metal frame by gluing both with an adhesive. By making the clearance 18 of the substrate retainer 30 equal to or slightly smaller than the thickness of the lateral side of the lower case 10, the clearance 18 is forced to become slightly larger than a given amount when the substrate retainer 30 is inserted toward the lateral side of the lower case 10. With such configuration, the light-source substrate 3 and the lateral side of the lower case 10 are clamped by increased pressure by elastic force of the substrate retainer 30. Consequently, thermal resistance between the substrate retainer 30 and the lower case 10 can be reduced, that is, the influence of heat on the substrate retainer 30 can be reduced The light sources can be replaced by sliding the light-source substrate 3 and the substrate retainer 30 through holes formed in the lateral sides of the upper case 9 and the lower case 10. The configuration of Embodiment 3 allows the number of parts to be reduced and is more preferable to improve workability of light source replacement.

Figure 13:
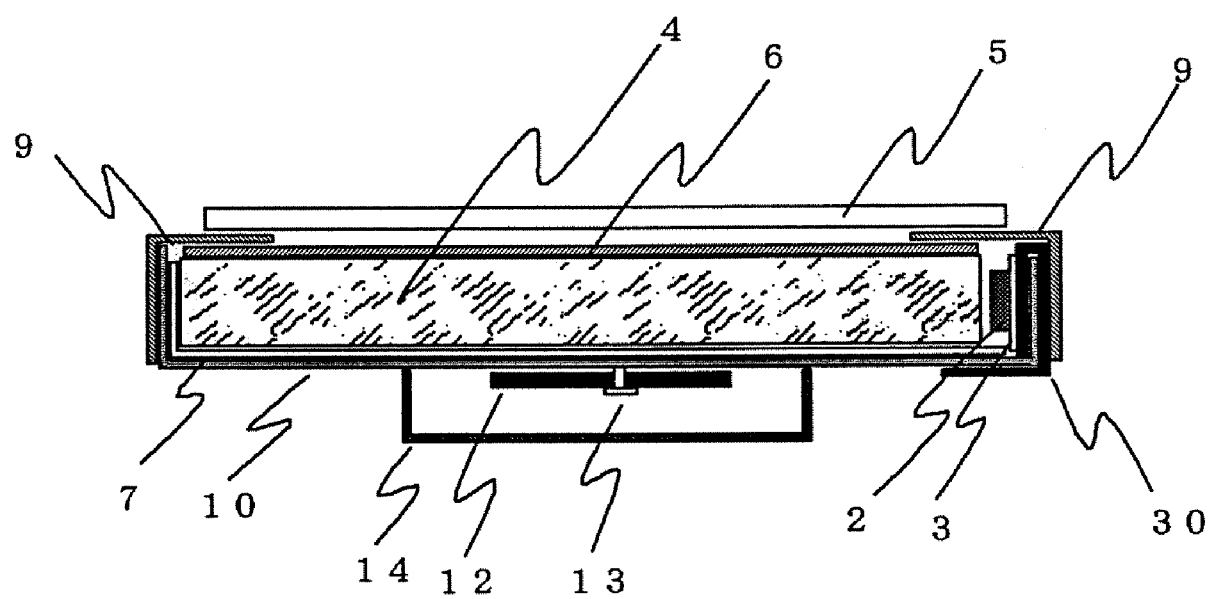
FIG. 13 is a cross-sectional view including a point light source of the liquid crystal display device in the aspect of Embodiment 3 of the invention.

The substrate retainer 30 in another aspect of Embodiment 3 is shown in an enlarged perspective view of FIG. 12 and a cross-sectional view of FIG. 13 (equivalent to the II-II directed cross-section in FIG. 2). The metal frame of the substrate retainer 30 has such a shape that it extends inward in parallel to the undersurface of the lower case 10 (on the opposite non-emitting-surface side), in addition to the shape to clamp the lateral side of the lower case 10 from both sides thereof. Thereby, the contact area between the substrate retainer 30 and the lower case 10 can be increased so that heat generated in the light sources can be efficiently transferred to the lower case 10. Moreover, the substrate retainer 30 is hardly displaced toward the emitting surface in inserting and withdrawing the light sources, which is preferable to further improve workability.

Similar to Embodiment 1 and 2, bosses and holes may also be formed for mutually positioning the substrate retainer 30 on the lateral side of the lower case 10, and mechanical fastening may also be provided further for fitting the substrate retainer 30 onto the upper case 9. A detailed explanation on their effect is omitted here because the effect is the same as that in Embodiment 1.

Embodiment 4

Figure 14:
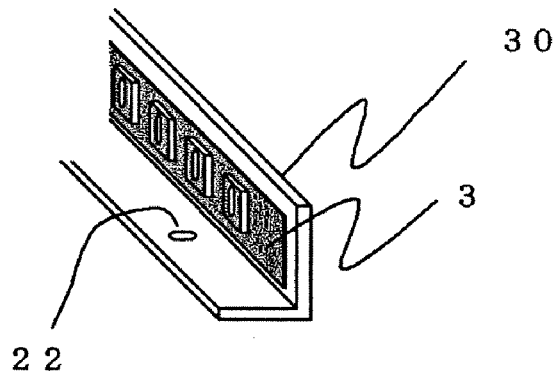
FIG. 14 is an enlarged perspective view illustrating a substrate retainer of a liquid crystal display device according to Embodiment 4 of the present invention.
Figure 15:
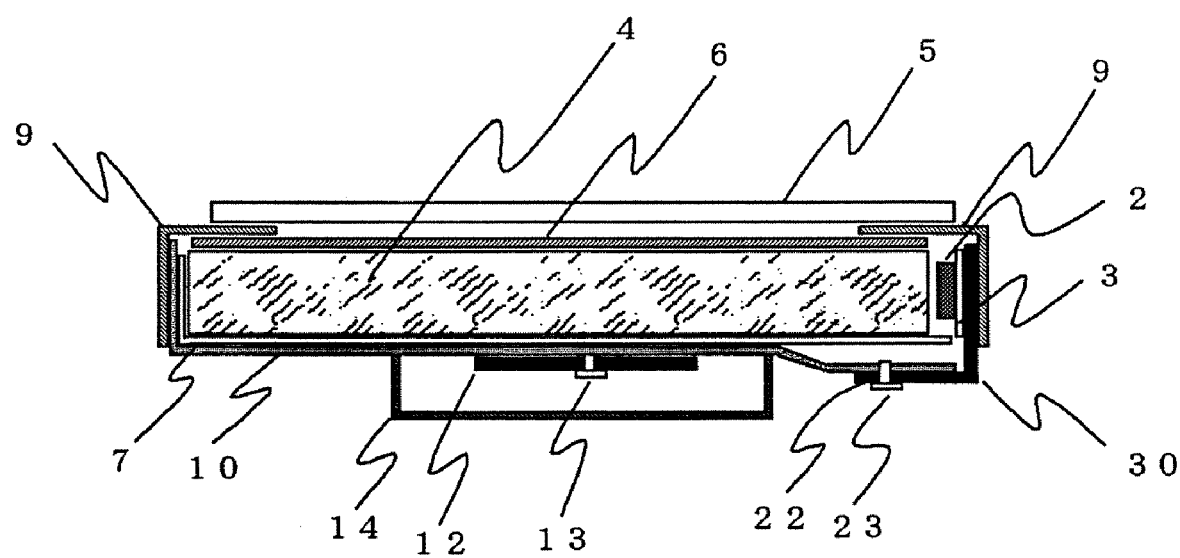
FIG. 15 is a cross-sectional view including a point light source of the liquid crystal display device according to Embodiment 4 of the invention.

Embodiment 4 of the present invention is explained with reference to FIGS. 14 and 15. FIG. 14 is an enlarged perspective view illustrating an external appearance of the light-source substrate 3 and the substrate retainer 30; FIG. 15, a cross-sectional view illustrating a complete display device. Configurations of components such as the light-guide plate 4, the optical sheets 6, the reflection sheet 7, the upper case 9 (the second case), the lower case 10 (the first case), the circuit board 12, and the protection case 14 in Embodiment 4 are the same as those in Embodiment 1, and the same reference numerals are assigned to them; their explanations are omitted here.

As shown in FIG. 14, the light-source substrate 3 is made of a glass-epoxy wiring substrate or FPC on which the point light sources 2 are mounted, and integrally configured with the substrate retainer 30 of a metal frame by gluing both with an adhesive. The substrate retainer 30 is "L" shaped and the light-source substrate 3 is disposed on a surface facing the incident surface A of the light-guide plate 4. Screw-fastening holes 22 are formed in a surface parallel to the opposite non-emitting surface C, on which no light sources are mounted.

FIG. 15 is a cross-sectional view illustrating the liquid crystal display device 1 of Embodiment 4, including one of the point light sources 2 (equivalent to the II-II directed cross-section in FIG. 2). The surface, parallel to the opposite non-emitting surface C, of the substrate retainer 30 on the emitting-surface side and the surface of the lower case 10 on the opposite non-emitting-surface side are in contact with each other. The lower case 10 has holes in the positions corresponding to the screw-fastening holes 22, in order for screws 23 to be screwed thereinto. The substrate retainer 30 and the lower case 10 are mechanically fastened with each other by the screws 23 inserted through the screw-fastening holes 22. It is preferable to optimize the contact area, the number of fastening screws, and their positions so that the substrate retainer 30 and the lower case 10 come into tight contact with each other. Moreover, it is more preferable to apply a silicon grease of high thermal conductivity or the like to the contact surfaces of the substrate retainer 30 and the lower case 10.

Heat generated in the point light sources 2 is conducted, through the light-source substrate 3 and the substrate retainer 30, to the lower case 10 via the contact surface of the substrate retainer 30. Consequently, it is preferable that the substrate retainer 30 be made of a metal having high thermal conductivity, in particular, pure aluminum, and be as thick as possible.

The light sources are withdrawn away from the opposite non-emitting surface by taking out the screws fastening the substrate retainer 30 with the lower case 10. In assembling, the substrate retainer 30 is inserted toward the emitting-surface side, and the substrate retainer 30 and the lower case 10 are fastened with each other by the screws.

In Embodiment 4, nails or hooks may be formed on the surface (not shown) facing that on which the light sources are mounted and sections that are shaped to engage those nails or hooks may be formed on the lateral side of the upper case 9. Thereby, the lower case 10 and the upper case 9 are preferably fastened mechanically with each other.

In Embodiment 4, while FIG. 14 illustrates an exemplary configuration in which the light-source substrate 3 is made of a glass-epoxy wiring substrate or FPC on which the point light sources 2 are mounted, a metal frame is employed as the substrate retainer 30, and both are integrally fixed with each other by gluing both with an adhesive, configurations are not limited to this. For example, providing the substrate holder 8 shown in Embodiment 1 with an extending portion in order to be fastened with the bottom lower case 10 and holes formed for inserting screws therethrough in the extending portion, the lower case 10 and the substrate holder 8 can be fastened mechanically with each other by screws as Embodiment 4, which can further reduce heat resistance.

Up to this point, the present invention has been explained in Embodiment 1 through 4. It goes without saying that individual combination of various shapes and the like in every embodiment can bring about the respective effects as exemplified above. While Embodiment 1 through 4 are configured such that the lower case is overlaid with the upper case, this relation may be inversed. In addition, the point light sources 2 used in the invention are not limited to LEDs as has described above. A light source producing white light by mixing red, green, and blue lights may be applied to every embodiment as a matter of course. Uniform white light can be obtained by suppressing occurrence of unevenness in luminance and color by making luminosity of each color light uniform at the emitting surface of light-guide plate 4.

While in Embodiment 1 through 4, a liquid crystal display device is illustrated provided with the liquid crystal panel 5 on the surface light-source device 50, the present invention is not limited to this. A display, such as a billboard and a guiding light, that shows images by using the surface light-source device 50, as a matter of course, may be provided in place of the liquid crystal panel 5. In addition, while a plate type one is used for the light-guide plate 4 in Embodiment 1 through 4, the invention is not limited to this. By forming the light-guide plate 4 in a wedge shape whose thickness decreases with distance apart from the light sources 2, incident light can be efficiently transmitted, that is, the light can be efficiently guided to the emitting surface B. Moreover, by forming the light-guide plate 4 in a wedge shape, the amount of light can be reduced that is reflected by the reflection sheet 7 on the opposite non-emitting surface C of the light-guide plate 4, which reduces reflection loss at the reflection sheet 7 so that the amount of light emitted from the emitting surface B can be increased.

What is claimed is:

1. A surface light-source device comprising:
  a plurality of point light sources;
  a light-guide plate arranged for receiving light, emitted from the point light sources, incident on at least one lateral side of the light-guide plate, and for emitting light from an emitting surface thereof perpendicular to the one lateral side;
  a first case having a first lateral side formed approximately in parallel to the one lateral side of the light-guide plate;
  a light-source substrate on which the point light sources are arranged at predetermined intervals, the light-source substrate being disposed on the first lateral side of the first case;
  a substrate holder having projections in positions corresponding to the intervals between the point light sources, for clamping the light-source substrate and the first lateral side of the first case together by the projections; wherein
  first holes are formed in the first case on the side thereof opposite from the emitting surface of the light-guide plate, in order for the projections to pass through.

2. The surface light source device as recited in claim 1, further comprising:
- a second case having an emitting aperture for surface emission of light from the light-guide plate, and being fitted to the first case, wherein
- second holes are formed in lateral sides of the first case and the second case, to allow the light-source substrate to be inserted and withdrawn, along the orientation in which the light sources are arranged, through the second holes, with the substrate holder having been removed in the direction away from the emitting surface of the light-guide plate.

3. A surface light-source device comprising:
- a plurality of point light sources;
- a light-guide plate arranged for receiving light, emitted from the point light sources, incident on at least one lateral side of the light-guide plate, and for emitting light from an emitting surface thereof perpendicular to the one lateral side;
- a first case having a first lateral side formed approximately in parallel to the one lateral side of the light-guide plate;
- a light-source substrate on which the point light sources are arranged at predetermined intervals, the light-source substrate being disposed on the first lateral side of the first case;
- a substrate holder having projections in positions corresponding to the intervals between the point light sources, for clamping the light-source substrate and the first lateral side of the first case together by the projections;
- a second case having an emitting aperture for surface emission of light from the light-guide plate, and being fitted to the first case; wherein
- first holes are formed in the second case on a side thereof facing the emitting surface of the light-guide plate, in order for the projections to pass through.

4. The surface light source device as recited in claim 3, wherein
- second holes are formed in lateral sides of the first case and the second case, to allow the light-source substrate to be inserted and withdrawn, along the orientation in which the light sources are arranged, through the second holes, with the substrate holder having been removed in the direction away from the emitting surface of the light-guide plate.

5. The surface light-source device as recited in any one of claims 2 through 4, wherein:
- the second case has a second lateral side formed approximately in parallel to the first lateral side of the first case; and
- the substrate holder clamps the light-source substrate, and the first and the second lateral sides together by the projections.

6. The surface light-source device as recited in claim 1, wherein the substrate holder is formed of a metal plate.

7. A surface light-source device comprising:
- a plurality of point light sources;
- a light-guide plate arranged for receiving light, emitted from the point light sources, incident on at least one lateral side of the light-guide plate, and for emitting light from an emitting surface thereof perpendicular to the one lateral side;
- a first case having a first lateral side formed approximately in parallel to the one lateral side of the light-guide plate;
- a light-source substrate on which the point light sources are arranged at predetermined intervals;
- a substrate retainer on which the light-source substrate is fixed, and the substrate retainer being integrated with the light-source substrate; wherein
- the substrate retainer is configured to clamp both faces of the first lateral side of the first case.

8. The surface light-source device as recited in claim 7, wherein
- the substrate retainer is extended inward with the extended portion being in contact with the first case on the side thereof opposite from the emitting surface of the light-guide plate.

9. The surface light-source device as recited in claim 7 or 8, further comprising:
- a second case including an emitting aperture for surface emission of light from the light-guided plate, and being fitted to the first case, wherein
- second holes are formed in lateral sides of the first case and second case, to allow the substrate retainer to be inserted and withdrawn, along the orientation in which the light sources are arranged, through the second holes, with the substrate holder having been removed in the direction away from the emitting surface of the light-guide plate.

10. A surface light-source device comprising:
- a plurality of point light sources;
- a light-guide plate arranged for receiving light, emitted from the point light sources, incident on at least one lateral side of the light-guide plate, and for emitting light from an emitting surface thereof perpendicular to the one lateral side;
- a first case for holding the light-guide plate;
- a light-source substrate on which the point light sources are arranged at predetermined intervals;
- a "L"-shaped substrate retainer in cross section, on which the light-source substrate is fixed, and the substrate retainer being integrated with the light-source substrate; wherein
- the substrate retainer is fastened with the first case on the side thereof opposite from the emitting surface of the light-guide plate, such that the point light sources are facing the one lateral side thereof.

11. The surface light-source device as recited in claim 10, wherein
- the substrate retainer in a state of the screws having been removed can be inserted and withdrawn in the direction away from the emitting surface of the light-guide plate.

12. The surface light-source device as recited in claim 1, wherein the point light sources include light emitting diodes.

13. The surface light-source device as recited in claim 3, wherein the substrate holder is formed of a metal plate.

14. The surface light-source device as recited in claim 3, wherein the point light sources include light emitting diodes.

15. The surface light-source device as recited in claim 7, wherein the point light sources include light emitting diodes.

16. The surface light-source device as recited in claim 10, wherein the point light sources include light emitting diodes.

* * * * *